(12) United States Patent
Pinkerton

(10) Patent No.: US 7,124,198 B2
(45) Date of Patent: Oct. 17, 2006

(54) APPARATUS AND METHOD FOR SCALING TCP OFF LOAD BUFFER REQUIREMENTS BY SEGMENT SIZE

(75) Inventor: Jim Pinkerton, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 820 days.

(21) Appl. No.: 10/016,609

(22) Filed: Oct. 30, 2001

(65) Prior Publication Data

US 2003/0084185 A1 May 1, 2003

(51) Int. Cl.
G06F 15/16 (2006.01)
(52) U.S. Cl. .................. 709/236; 709/212; 709/231
(58) Field of Classification Search ................ 709/236
See application file for complete search history.

(56) References Cited

U.S. PATENT DOCUMENTS

| | | | |
|---|---|---|---|
| 5,583,859 A * | 12/1996 | Feldmeier | 370/471 |
| 6,094,712 A | 7/2000 | Follett et al. | |
| 6,141,705 A | 10/2000 | Anand et al. | |
| 6,226,680 B1 | 5/2001 | Boucher et al. | |
| 6,247,060 B1 | 6/2001 | Boucher et al. | |
| 6,334,153 B1 | 12/2001 | Boucher et al. | |
| 6,381,647 B1 * | 4/2002 | Darnell et al. | 709/232 |
| 6,434,620 B1 * | 8/2002 | Boucher et al. | 709/230 |
| 6,675,200 B1 * | 1/2004 | Cheriton et al. | 709/212 |
| 6,804,776 B1 * | 10/2004 | Lothberg et al. | 713/160 |
| 6,819,679 B1 * | 11/2004 | Kerns et al. | 370/474 |
| 2001/0021949 A1 | 9/2001 | Blightman et al. | |
| 2001/0023460 A1 | 9/2001 | Boucher et al. | |
| 2001/0027496 A1 | 10/2001 | Boucher et al. | |
| 2001/0047433 A1 | 11/2001 | Boucher et al. | |
| 2002/0049875 A1 * | 4/2002 | Giora et al. | 710/301 |

OTHER PUBLICATIONS

Chase et al. "The Case for RDMA." IETF Working Draft, Dec. 2000. http://www.cs.duke.edu/ari/publications/draft-csapuntz-caserdma-00.txt.*
S. Dicecco & J. Williams, "VI/TCP (Internet VI), " Jul. 14, 2000 at http://quimby.gnus.org/internet-drafts/draft-dicecco-vitep-00.txt (last visted Mar. 16, 2006).
C. Sapuntzakis, "iSCSI/VI/TCP proposal," Jun. 2000 at http://ftp.ist.utl.pt/pub/drafts/draft-csapuntz-ips-iscsivi-00.txt (last visted Mar. 16, 2006).
J. Williams, J. Pinkerton, C Sapuntzakis, J. Wendt, & J. Chase, "ULP Framming for TCP," Mar. 13, 2001 at http://search.ietf.org/internet-drafts/draft-williams-tepulpframe-01.txt (last visited Jul. 9, 2001).

(Continued)

Primary Examiner—Rupal Dharia
Assistant Examiner—Nicholas Taylor
(74) Attorney, Agent, or Firm—Microsoft Corporation

(57) ABSTRACT

A method and apparatus to ensure that protocol data units received out of order do not have to be buffered by a reassembly buffer in the performance path is presented. When an application or device requests to transfer data with another application or device, a framing protocol sends one or more complete protocol data units preceded by a framing header that is aligned with the transport header. The framing header contains information that allows the receiving application or device to determine where the protocol data unit should be placed so that successive protocol data units can be recovered when a previous protocol data unit has been received out of order.

19 Claims, 5 Drawing Sheets

OTHER PUBLICATIONS

J. Pinkerton, M. Krause, & S. Bailey, "Requiremetns for an RDMA Protocol," Jun. 2001 at http://search.ietf.org/internet-drafts/draft-pinkerton-rdma-reqnts-00.txt (last visited Jul. 9, 2001).

C. Sapuntzakis & D. Cheriton, "TCP RDMA option," Feb. 2000 at http://suif.stanford.edu/~csapuntz/draft-csapuntz-tcprdma-00.txt (last visited Mar. 16, 2006).

S. Bailey, J. Pinkerton, C. Sapuntzakis, M. Wakeley, J. Wendt, & J. Williams, "ULP Framing for TCP," Jan. 2001 at http://wwwl.tools.ietf.org/html/draft-ietf-tsvwg-tcp-ulp-frame-00.txt (last visited Mar. 16, 2006).

M. Wakeley, "iSCSI Message Boundary Detection Proposal," Sep. 2000 at http://www.ietf.org/internet-drafts/draft-wakeley-iscsi-msgbndry-00.txt (last visited Jul. 9, 2001).

"Information Systems–dpANS Fibre Channel Protocol for SCSI," Draft Proposed American National Standard, Robert Snively ed., Apr. 12, 1995.

"Information Technology —Scheduled Transfer Protocol (ST)," Working Draft, Don Tolmie ed., Jan. 2, 1999.

"Fibre Channel Protocol for SCSI, Second version (FCP-2)," Draft American National Standard, Mar. 7, 2001.

* cited by examiner

APPARATUS AND METHOD FOR SCALING TCP OFF LOAD BUFFER REQUIREMENTS BY SEGMENT SIZE

FIELD OF THE INVENTION

This invention relates generally to networked communications and, more particularly, relates to a system and method for managing the buffering of data in systems having transport layers that do not have self-describing transport segments.

BACKGROUND OF THE INVENTION

Computer networking allows applications residing on separate computers or devices to communicate with each other by passing data across the network connecting the computers. The amount of data segments being sent across networks is rapidly increasing. The increase is due to several factors. These factors include the growth in the number of networked computers and the explosion in growth of digitally based multimedia, which is the combination of video and audio in a digital format for viewing on a computer or other digital device.

Data is typically sent in segments or packets. One of the problems that has occurred as a result of the increased data flow is segment delay, segment loss and reordering of segments (e.g., segments arriving out of order). The segment delay, segment loss, and reordering of segments causes problems for many applications that rely on the data being received timely and in the order it was sent. For example, applications such as digitally based multimedia that receive data sent in segments must receive the data in the order the segments were sent and without any delay for proper playback.

Many data transmission protocols account for segment delay, loss, and reordering by placing the data in an intermediate reassembly buffer to restore the sending order which may have been lost as a result of segment delay, loss, or reordering. If data comes in order, the data is put directly in a destination buffer. If data does not come in order, the data is put into an intermediate reassembly buffer. The bandwidth required to move data in and out of the buffer memory of the intermediate reassembly buffer is more than twice the bandwidth of the incoming data. The size of the buffer memory required is:

K*(window_size)*(# connections)

where K is a constant. Window_size is generally assumed to be the bandwidth delay product, which is the round trip time (RTT) of data sent between the sending computer and the receiving computer multiplied by the bandwidth of the data. As the speed of networks increases, the required speed and size of the buffer also increases. For example, on a local area network running at one gigabit/sec with a one millisecond RTT having 100 simultaneous connections, the memory required is 12.5 MB. For wide area networks running at ten gigabits/sec and having 100 millisecond RTT and 100 simultaneous connections, the total buffer memory required is 12.5 GB.

The required buffer memory is a problem when the Transmission Control Protocol (TCP) is offloaded from the host to a network interface card (NIC). When the TCP is running on a NIC, the intermediate reassembly buffer is typically placed on the NIC connection (i.e., on the network interface card). Today, network interface cards having megabytes or gigabytes of memory are not cost competitive due to the memory size and high speed requirements.

One approach that the computer industry has taken to reduce the amount of memory needed is the development of upper layer protocols (ULPs), such as those which perform bulk data transfer, that permit the final location (i.e., a client's buffer) to be known when the data is received. An upper layer protocol is a protocol that resides above the data transmission protocol layer in the computer or other digital device. The ULPs that perform bulk data transfer include specific application ULPs such as iSCSI and generic hardware acceleration ULPs such as a remote direct memory access (RDMA) protocol. When an upper layer protocol that permits the final location to be known is used, the data can be directly placed at the final location by a direct placement network interface that has knowledge of the final location.

The information required to find the final location is contained in the upper layer protocol protocol data unit (ULP PDU) header. A ULP PDU is an upper layer protocol data packet or message. However, the ULP PDU is not always identical to the size of the transport segment used by the transport protocol to send the data over the network. When this occurs, the ULP PDU is split and placed into several transport segments. This results in the ULP PDU header not being located in every transport segment and located at any place in a transport segment. The transport segments that do not contain the ULP PDU header are called non self-describing transport segments because they do not have sufficient information to directly place the data into its final location. The ULP PDU header must be located for direct placement to work.

One solution to finding the ULP PDU header in the transport segment (i.e., transport data packet) is to put a marker in each transport segment at a predefined period that provides a pointer to ULP PDU header of the next PDU. If the period is high relative to packet loss rate (e.g., once per segment), the location of the next PDU can be found with a very high likelihood when a previous PDU header has been lost. The problem with this solution is that data must still be buffered. The minimum size of the buffer required is:

k*(the size of the ULP PDU)*(the number of connections)

where k is a constant. If the size of the ULP PDU is limited to the transport segment size, the minimum buffer size required is:

(maximum transport segment size)*(the number of connections)

In cases where many transport segments having ULP PDU headers are lost, the buffer size required for direct placement approaches the intermediate reassembly buffer sizes of multiple gigabytes as indicated above.

BRIEF SUMMARY OF THE INVENTION

The present invention provides a method to ensure that there is enough information in each transport segment to allow the data being sent in the transport segment to be placed in the client's buffer. A framing header is aligned with the transport segment header so that the framing header is at the beginning of the transport segment. Information is placed in the framing header that describes the transport segment in sufficient detail to allow the data in the transport segment to be placed in its final destination. This effectively eliminates the need for an intermediate reassembly buffer in the performance path (i.e., the primary path in which the data is being received).

The information includes the length of the transport segment (i.e., the size), an offset and the ULP client buffer id. In an alternate embodiment, the information includes the ULP client buffer id and the ULP client buffer address.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

The present invention ensures that ULP PDUs received out of order do not have to be buffered by an intermediate reassembly buffer in the performance path. To provide this ensurance, each transport segment begins with segment description information and contains an integral number of ULP PDUs. Segment description information is information that is sufficient for direct data placement to occur. Direct data placement occurs when a receiving node directly maps the incoming data (e.g., the data in the ULP PDU) to a specific ULP buffer and a specific offset within that buffer. In this way, the destination location of the ULP PDU is known and the out of order ULP PDU is placed in its destination location. The size of the buffer memory required is reduced to:

k*(the maximum transport segment size)

where k is a constant. In systems having direct placement capability, the present invention allows the data in each transport segment to be placed in its final destination independently of all other segments and requires no intermediate reassembly buffers in the performance path.

Although not required, the invention is described hereinafter in the general context of computer-executable instructions, such as program modules, being executed by a processing device. Generally, program modules include routines, programs, objects, components, data structures, and the like that perform particular tasks or implement particular abstract data types. Moreover, those skilled in the art will appreciate that the invention may be practiced with other computer system configurations, including network interface cards, hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
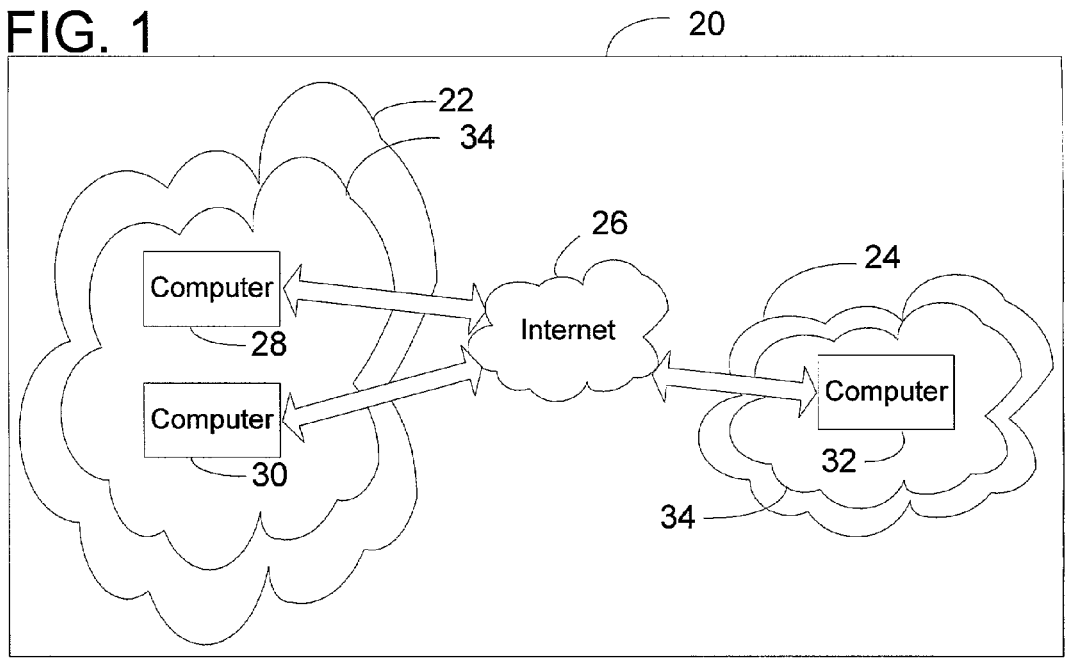
FIG. 1 is a block diagram illustrating a network system having a plurality of networks connected by a transport in which the present invention operates.

Turning to the drawings, wherein like reference numerals refer to like elements, the invention is illustrated as being implemented in a suitable networking environment such as the network system environment 20 illustrated in FIG. 1. The network system environment 20 is only one example of a suitable computing environment and is not intended to suggest any limitation as to the scope of use or functionality of the invention. For example, those of skill in the art will appreciate that the invention can also be used in wireless systems and that various of the acts and operations described hereinafter may also be implemented in hardware.

The exemplary network system 20 includes local sub-networks 22, 24 connected to each other by network 26. Network 26 may be a virtual private network, a LAN, a WAN, the Internet, and the like. Local sub-network 22 has general purpose computing devices in the form of computers 28, 30, and local sub-network 24 has computer 32. The network system 20 may have additional local sub-networks and local sub-networks 22, 24 may have additional computers. Each sub-network 22, 24 is served by a transport provider 34, such as TCP/IP, for providing communication between computers and between applications residing on computers.

Figure 2:
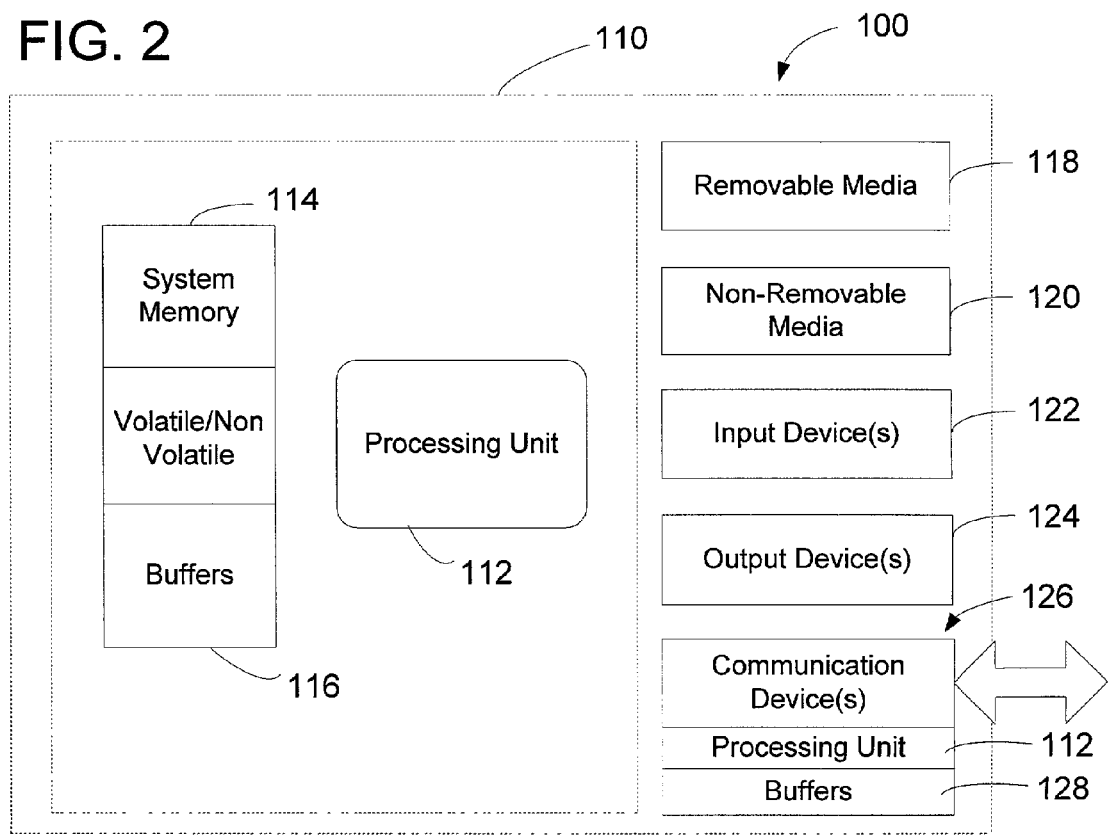
FIG. 2 is a block diagram generally illustrating an exemplary computer system on which the present invention resides.

An example of a suitable computing system environment 100 on which the invention may be implemented is illustrated in FIG. 2. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, handheld or laptop devices, multiprocessor systems, microprocessor-based systems, set top boxes, network cards, programmable consumer electronics, network PCs, minicomputers, mainframe computers, distributed computing environments that include any of the above systems or devices, and the like.

The invention may be described in the general context of computer-executable instructions, such as program modules, being executed by a processing device. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a processing device 110. It should be noted that computers 28, 30, 32 are similar to processing device 110 and have similar components. In its most basic configuration, processing device 110 typically includes a processing unit 112 and system memory 114. Processing unit 112 spans a diverse set of implementations including a central processing unit, a hardware finite state machine based implementation, and a microprocessor assembly language implementation. Depending on the exact configuration and type of computing device, memory 114 may be volatile (such as RAM), non-volatile (such as ROM, flash memory, etc.) or some combination of the two. Memory 114 has buffers 116 for receiving, sending, and storing data. Additionally, processing device 110 may also have removable mass storage 118 and/or non-removable mass storage 120 such as magnetic disks, magnetic cassettes, optical disks or tape. Similarly, processing device 110 may also have input devices 122 such as a mouse, a keyboard, a modem, and the like and/or output devices 124 such as a display, a printer, speakers and the like. Other aspects of processing device 110 may include communication device 126 for communicating to other devices, computers, networks, servers, etc. using either wired or wireless media or a combination of the above. Network communication occurs through communication device 126 and may include buffers 128 on the communication device 126, buffers 116 in the processing device 110, or a combination of buffers 116 and buffers 128. All of these devices are well known in the art and need not be discussed at length here.

Processing device 110 typically includes at least some form of computer readable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory, or other memory technology, CD-ROM, digital versatile disks (DVD) or other optical storage, magnetic cassettes, magnetic tape, magnetic disk storage or other magnetic storage devices, or any other medium which can be used to store the desired information. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 3:
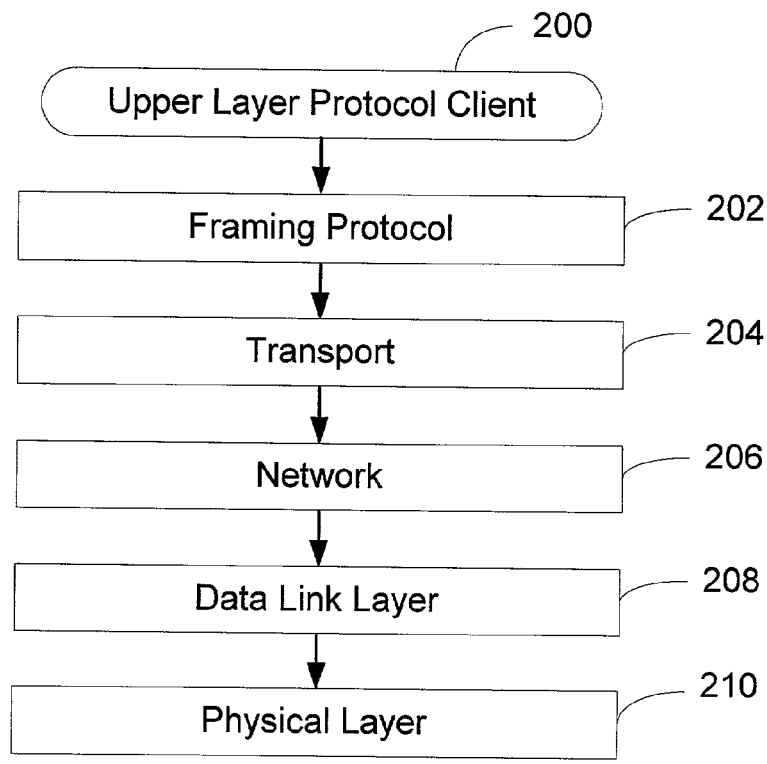
FIG. 3 is a block diagram illustrating an embodiment of a network protocol stack employing a framing protocol in accordance with the teaching of the present invention.
Figure 4:
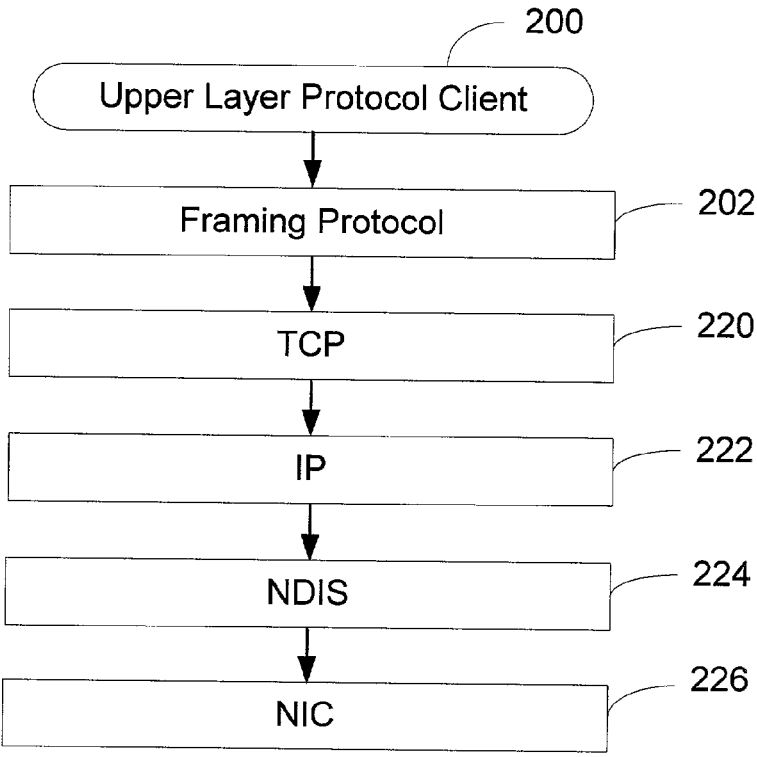
FIG. 4 is a block diagram illustrating an alternate embodiment of an operating system employing a framing protocol in accordance with the teaching of the present invention.

FIGS. 3 and 4 illustrate where the framing protocol of the present invention resides on standard network stack (or layer) architectures that have transport layers that use transport protocols. The framing protocol and transport protocol may reside in the processing device 110 or in the communication device 126 or in a combination of the processing device 110 and communication device 126. FIG. 3 shows an architectural overview of an embodiment of the framing protocol according to the invention implemented in the International Standard Organization's Open System Interconnect (ISO/OSI) model. In this embodiment, the framing protocol 202 is in communication with upper layer protocol client 200 and with transport layer 204. The framing protocol 202 may be integrated with the transport layer 204. The transport layer 204 resides above the network layer 206 and enforces desired transmission control using a transport protocol. A transport protocol controls the transmission of transport segments. The network layer 206 ensures that information arrives at its intended destination across a diverse set of data link layers. The data link layer 208 resides below the network layer 206 and packages and addresses data and manages the flow of transmissions on a local link. The physical layer 210 resides below the data link layer 208 and deals with all aspects of establishing and maintaining a physical link between communicating computers.

FIG. 4 shows an architectural overview of an embodiment of the framing protocol implemented in the TCP/IP environment. The framing protocol 202 sits above the standard TCP protocol 220, which is a transport protocol, and the IP protocol 222. The IP protocol 222 is in communication with the network interface card (NIC) 226 via NDIS 224. While the framing protocol 202 has been illustrated as a separate layer in FIGS. 3 and 4, the framing protocol 202 may be integrated with other layers.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 5:
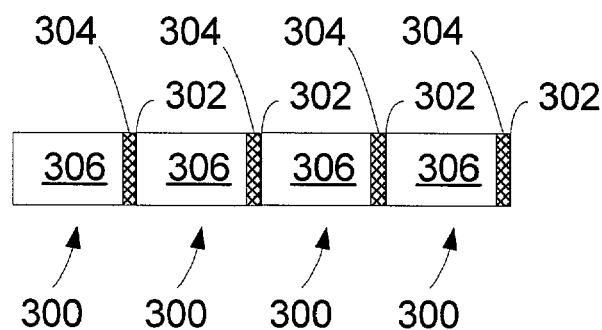
FIG. 5 is a diagram illustrating an example of a framing header aligned with a transport segment header in accordance with the present invention.

Now that the architecture in which the invention operates and resides has been described, the steps taken to ensure that each transport segment begins with an ULP PDU (i.e., the ULP PDU is aligned with the transport segment) and contains an integral number of ULP PDUs can be described as illustrated in FIG. 5. Turning now to FIG. 5, each transport segment 300 has a transport header 302. The invention places a framing header 304 having segment description information within or after the transport header 302. The segment description information describes the data 306 with sufficient detail so that data in transport segments received out of order can be placed in its destination location. Transport segments that have the segment description information are called self-describing segments.

Figure 6A:
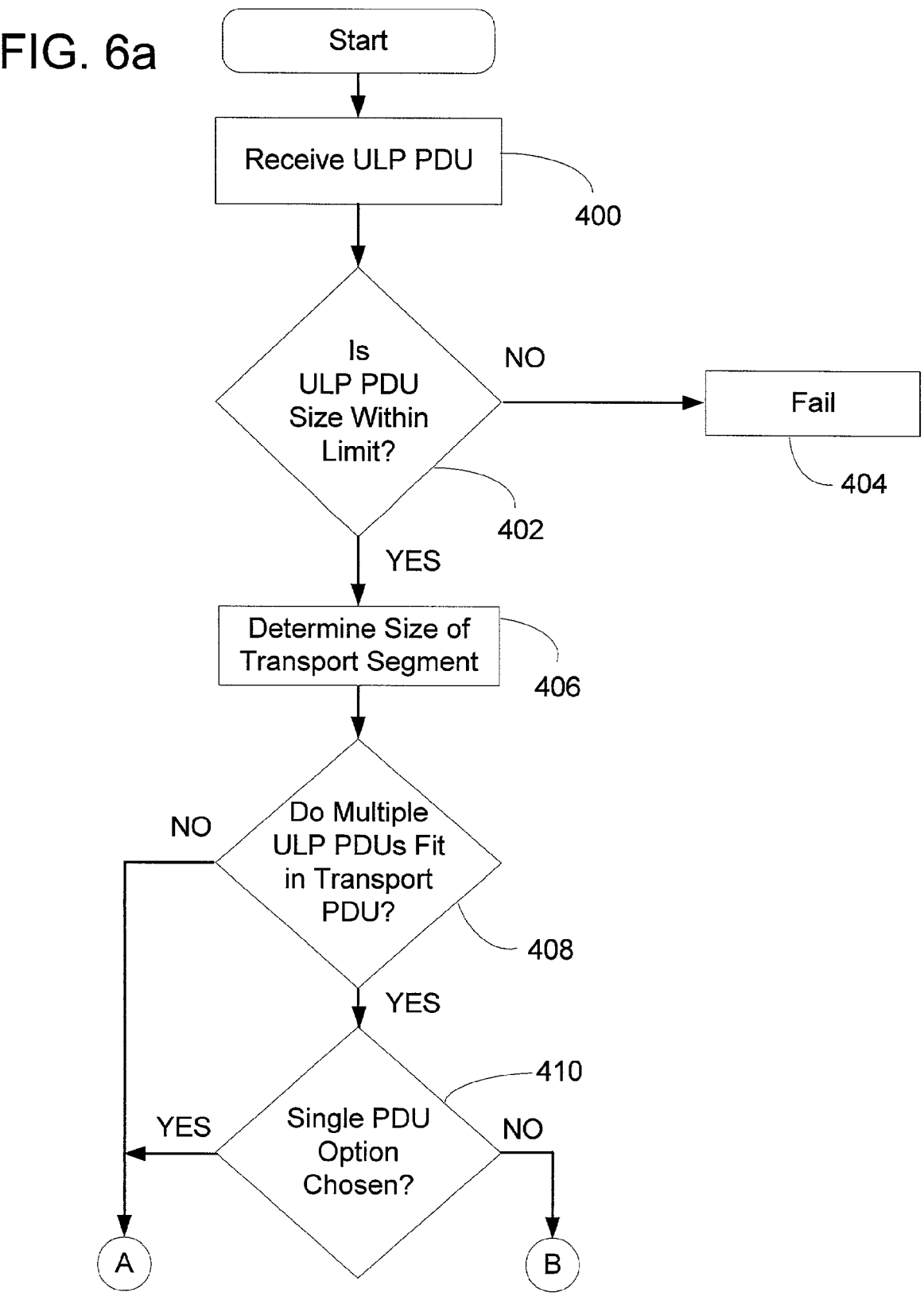
FIGS. 6a and 6b illustrate a flow chart of a method of transforming a non self-describing protocol data unit into a self-describing protocol data unit in accordance with the present invention.
Figure 6B:
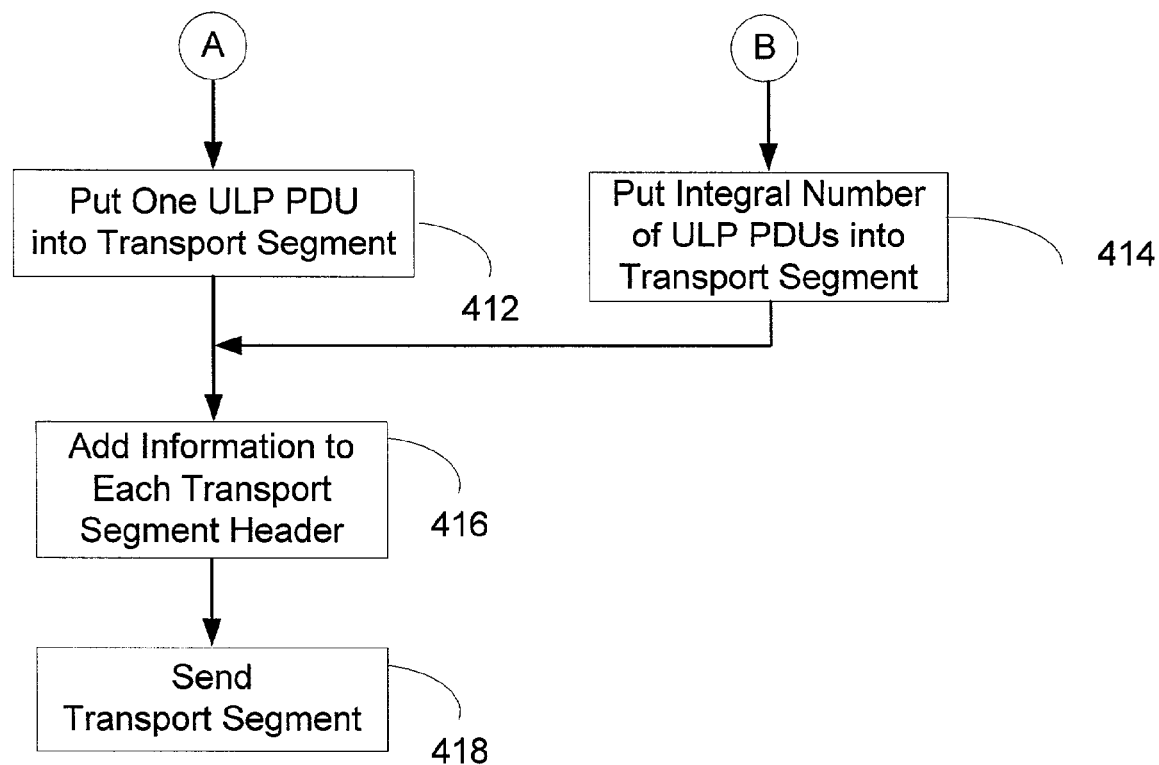

Turning now to the flow diagram of FIGS. 6a and 6b, the framing protocol receives and processes the ULP PDU (step 400) from an upper layer sender (e.g., an application, a device, a ULP, etc.) to hand off to the transport layer to send to an upper layer receiver. The framing protocol uses buffers 116, buffers 128, or a combination of buffers 116, 128 to receive and process the ULP PDU. The framing protocol first determines if the size of the ULP PDU fits within predetermined limits (step 402). The limits are selected based upon the transport segment size being used, the maximum transport segment size defined by the protocol used, and the degree that the transport protocol supports chunking. A chunking operation is an operation that splits the ULP PDU into packets that fit within the current transport segment size. The limits are provided to the framing protocol by the transport protocol. The framing protocol is notified when the transport segment size presently being used changes.

If the ULP PDU size submitted by the ULP is outside the limit, the framing protocol fails the submission and generates an error message (step 404). In an alternate embodiment, the framing protocol performs a chunking operation on the ULP PDU when the ULP PDU size is larger than the limit. The chunking operation splits the ULP PDU into packets that fit within each transport segment and splits the ULP PDU into multiple transport segments. The offset within the buffer from the base of the buffer and/or the buffer address is incremented in the transport segments so that direct data placement can occur.

The length (i.e., size) of the ULP PDUs packed in the transport segment is determined by the framing protocol (step 406). If the ULP PDU size is within the limit, the framing protocol determines if multiple ULP PDUs fit within a transport segment (step 408). If multiple ULP PDUs will fit within the transport segment, the framing protocol determines if a single PDU option was chosen (step 410). The single PDU option is selected by the receiver (e.g., receiving application, protocol, etc.) or the transmitter (e.g., sending application, protocol, etc.). When this option is selected, only one ULP PDU may be packed into a transport segment.

If multiple ULP PDUs do not fit within a transport segment or the single PDU option was chosen, the framing protocol puts one ULP PDU into a transport segment (step 412). If multiple ULP PDUs fit within a transport segment and the single PDU option was not chosen, an integral number of ULP PDUs are put into a transport segment (step 414).

Information that self-describes the transport segment is placed into the transport header or right after the transport header in a framing header (step 416) and the transport segment is sent to the receiver (step 418). This information, which is called segment description information, includes the length and an identifier that identifies the connection. This information provides a receiver with sufficient information to determine where the ULP PDU should be placed. This allows successive ULP PDUs to be recovered in the event of transport segment delay, loss, or reordering. In the event direct placement networks are being used, further information is put in the transport segment to allow the transport payload (i.e., the ULP PDU(s)) to be put in its final destination. The additional information includes the buffer id where the data is to be placed and the offset (i.e., the offset within the buffer from the base of the buffer).

Figure 7:
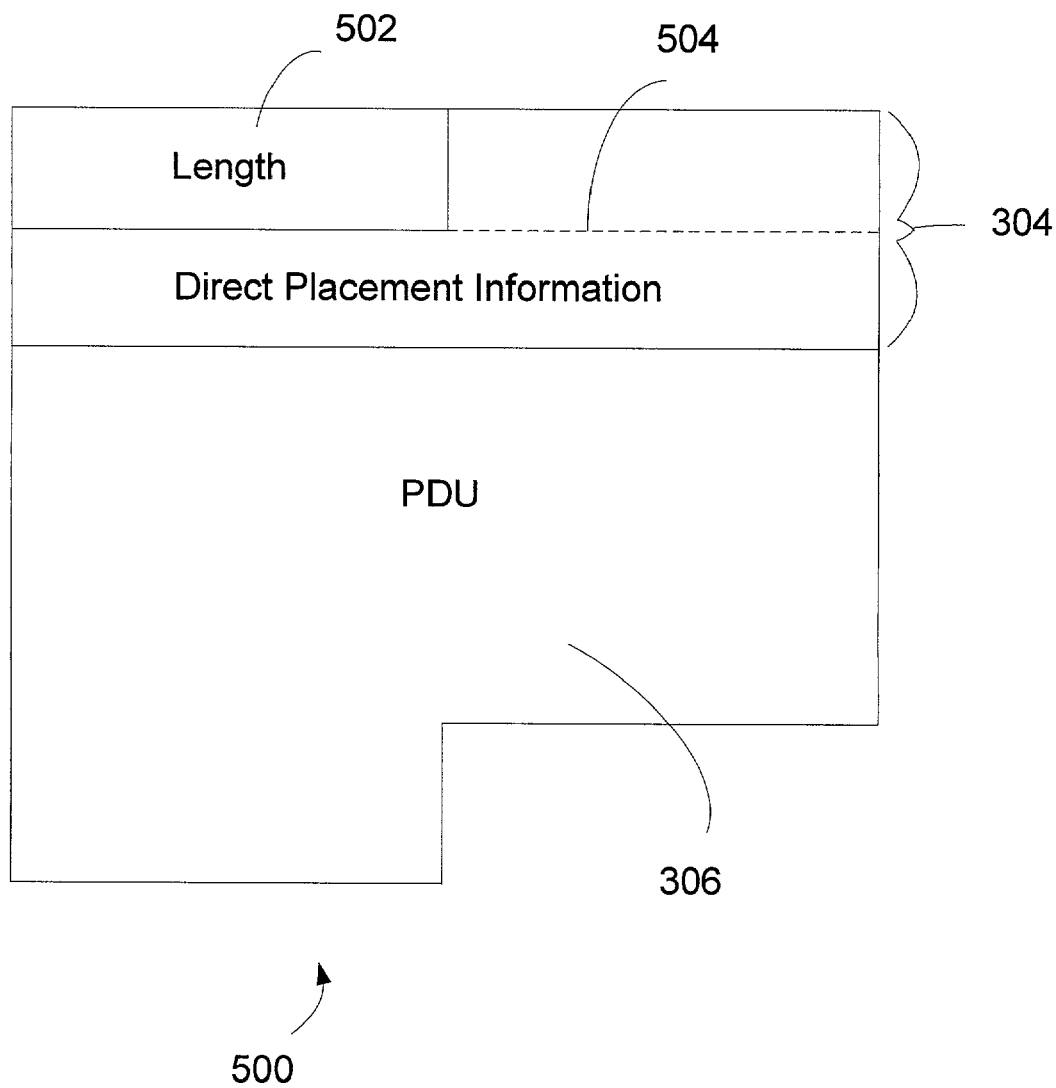
FIG. 7 is a diagram illustrating the format of a framing data unit in accordance with the present invention.

Turning now to FIG. 7, the format of a self-describing transport segment 500 is illustrated. The length field 502 and identifier field 504 are part of the framing header 304. Following the framing header is at least one integral ULP PDU in the payload 306. The direct placement information (buffer id and offset) is also placed in the framing header 304.

There are exceptions to sending an integral ULP PDU in a transport segment. These exceptions include situations when the connection is in emergency mode, when the transport maximum segment size has been reduced, and when the sender is probing to determine if the maximum transport segment size unit can be increased. A connection is in emergency mode when the transport segment size being used shrinks to a size which leaves no room for a complete ULP PDU to be sent. When an emergency mode occurs, the framing protocol may fragment an ULP PDU across multiple transport segments. The transport segments having a fragment of an ULP PDU should not appear to be a complete ULP PDU to the receiving application/device. There are many ways to ensure this occurs. For example, in one embodiment, this is ensured by the sender making sure that either the data in the length field does not equal the transfer segment length, or that the transfer segment length is less than the framing header in each transport segment.

As previously indicated, the present invention allows the data in each transport segment to be placed in its final destination independently of all other segments and requires no intermediate reassembly buffers in the performance path. A reassembly buffer is needed if synchronization of the framing header with the transport header is lost or if there is a program module or hardware device (i.e., a middle box) re-segmenting the data stream in the network. The former example (i.e., loss of synchronization) is a transient condition that only occurs when a path transport segment size being used has been reduced and there is no middle-box in the network which is re-segmenting the data stream. If the path transport segment size being used is reduced, any transport segments already converted to self-describing segments and posted to the transmitter will be re-segmented and will result in non self-describing segments being sent to the destination. If the destination does not use a reassembly buffer, these non self-describing segments can never be successfully transmitted. The reassembly buffer must be large enough to recover a transport segment that is less than or equal to the maximum transport segment size of the locally attached link.

The invention has been described with some references to the TCP protocol. The invention may also be used with other protocols, such as SCTP, that use transport segments that do not describe in sufficient detail where the payload is to be placed.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method to configure transport segments of a transport-level protocol for transporting an upper layer protocol transfer, where the transport-level protocol is layered above a network-level protocol, and where each transport segment comprises a standard transport header and a body separate from and following the standard transport header, the method comprising the steps of:

receiving upper layer segments which are segments of the upper layer protocol, where each upper layer segment includes a respective original remote direct memory location indicating where to place its payload directly into remote memory;

determining that at least some of the received upper layer segments do not integrally fit within transport segments and in response splitting those upper layer segments to create split segments;

aligning framing headers with the transport segments by putting a framing header in the body of each transport segment that carries a split segment; and putting segment description information in each framing header, the segment description information indicating a remote direct memory location for the split segment that is being carried by the segment, where the remote direct memory location is determined based on the original remote direct memory location of the corresponding upper layer segment from which the split segment was obtained, and where the remote direct memory location in the framing header allows direct placement in remote memory.

2. The method of claim 1 further comprising the step of limiting an upper layer protocol data unit size to the smaller of a maximum transport segment size and a size that will fit within non self-describing segments.

3. The method of claim 1, wherein the direct memory location put in the framing header comprises a destination buffer id and an offset within the identified buffer.

4. The method of claim 1, wherein the direct memory location put in the framing header comprises a destination memory address.

5. A computer-readable medium having computer executable instructions for performing one or more steps to configure transport segments of a transport protocol for transporting upper layer protocol (ULP) protocol data units (PDUs), where the transport-level protocol is layered above a network-level protocol, and where the transport segments each comprise a standard transport header and a separate body following the standard transport header, the one or more steps comprising:

receiving upper layer PDUs which are PDUs of the upper layer protocol, where each upper layer PDU includes a respective original remote direct memory location indicating where to place its payload directly Into remote memory;

determining that at least some of the received upper layer PDUs do not integrally fit within transport segments and in response splitting those upper layer PDUs to create split PDUs; and aligning the upper layer protocol with the transport protocol by placing, in the body of transport segments, one or more split PDUs that each has a respective header comprising segment description information indicating a remote direct memory location for corresponding data of the ULP, where the remote direct memory location is determined based on the original remote direct memory location of the corresponding upper layer PDU from which the split PDU was obtained, and where the remote direct memory location in the framing header allows direct placement in remote memory.

6. The computer-readable medium of claim 5 having further computer executable instructions for performing a step of putting zero-copy information in a non self-describing transport segment.

7. The computer-readable medium of claim 5, wherein the direct memory location of the split PDU comprises a destination memory address.

8. The computer-readable medium of claim 5, wherein the direct memory location comprises a destination buffer id and a data size and offset in the identified destination buffer.

9. A method to configure transport segments of a transport protocol for transporting upper layer protocol (ULP) protocol data units (PDUs), where the transport-level protocol is layered above a network-level protocol, and where the transport segments each comprise a standard transport header and a body separate from and following the standard transport header, the method comprising the step of:

receiving upper layer PDUs which are PDUs of the upper layer protocol, where each upper layer PDU includes a respective original remote direct memory location indicating where to its payload belongs in remote memory;

determining that at least some of the received upper layer PDUs do not integrally fit within transport segments and in response splitting those upper layer PDUs to create split PDUs; and ensuring that the body of each transport segment that transports data for the upper layer protocol is provided with one or more corresponding integral ULP PDUs that each has a header comprising segment description information indicating a remote direct memory location for corresponding data of the upper layer protocol, where at least some of the integral ULP PDUs are split PDUs whose remote direct memory locations are determined based on the original remote direct memory locations of the respective upper layer PDUs from which the split PDUs were obtained, and where the remote direct memory locations allow direct placement in remote memory.

10. The method of claim 9 further comprising a step of putting zero-copy information in a transport segment carrying a split PDU.

11. The method of claim 9 wherein the segment description information in the header includes a destination memory address.

12. The method of claim 9 wherein the segment description information in the header includes a data size and an offset in the transport segment.

13. A method of sending data via a network between an upper layer sender and an upper layer receiver through a transport that implements a transport-level protocol and that sends data in transport segments, where the transport-level protocol is layered above a network-level protocol and below the upper layer sender and upper layer receiver, and where each segment comprises a standard transport header and a body separate from and following the standard transport header the method comprising the steps of:

receiving upper layer segments which are segments of the upper layer protocol, where each upper layer segment includes a respective original remote direct memory location indicating where to place its payload directly into remote memory; and determining if transport segments are too small to carry at least some of the upper layer segments, and when a transport segment is determined to be too small;

splitting upper layer segments into split segments and providing split segments with framing headers containing segment description information indicating respective remote direct memory locations for upper layer data framed by the framing headers;

ensuring that each framing header and all of the corresponding upper layer data framed thereby are integrally put in the bodies of transport segments; and putting the segment description information in the framing header; and sending the transport segment to the upper layer receiver.

14. The method of claim 13, where the method further comprises ensuring that only an integral number of upper layer segments are put into the transport segment.

15. A network interface card comprising:

memory buffers for receiving transport segments of a transport-level protocol that is layered above a network-level protocol, where each segment comprises a standard transport header and a body separate from and following the standard transport header;

a processing unit in communication with the memory buffers, the processing unit comprising a first module for detecting if segments of an upper level protocol do not fit in transport segments; and a second module for splitting a split segment from an upper level segment detected to not fit in a transport segment, providing the split segment with a header, and putting segment description information in the header of the split segment, where the header is put in the body of the transport segment, where all data corresponding to the header is ensured to be encapsulated in the body of the transport segment, where the segment description information indicates a remote direct memory location of that data, and where the remote direct memory location is determined from the upper level segment from which the split segment was split.

16. The network interface card of claim 15 wherein the processing unit aligns the header with the transport segment's header.

17. The network interface card of claim 15 wherein the processing unit limits an upper layer protocol data size to the smaller of a maximum transport segment size and a size that will fit within the transport segment.

18. A network interface card comprising:

memory buffers for receiving transport segments of a transport-level protocol that is layered above a network-level protocol, where each segment comprises a standard transport header and a body separate from and following the standard transport header; and a processing unit in communication with the memory buffers, the processing unit performing the steps of:

detecting if segments of an upper level protocol do not fit in a transport segment; and if a transport segment is detected to be a non self-describing segment:

splitting a split segment from an upper level segment detected to not fit in a transport segment;

providing the split segment with a header; and putting segment description information in the header of the split segment, where the header is put in the body of the transport segment, where all upper level data corresponding to the header is ensured to be encapsulated in the body of the transport segment, where the segment description information indicates a remote direct memory location of that data, and where the remote direct memory location is determined from the upper level segment from which the split segment was split.

19. The network interface card of claim 18 wherein the processing unit aligns the header with the transport segment's header.

* * * * *